United States Patent [19]

Schwartz

[11] Patent Number: 4,518,256

[45] Date of Patent: May 21, 1985

[54] ENHANCED ACCURACY OPTICAL RADAR

[75] Inventor: Jacob Schwartz, Arlington, Mass.

[73] Assignee: Sanders Associates, Inc., Nashua, N.H.

[21] Appl. No.: 799,827

[22] Filed: May 23, 1977

[51] Int. Cl.³ .................. G01C 3/08; G01C 1/00; G01P 3/36; G01B 11/26

[52] U.S. Cl. .................. 356/5; 328/110; 343/9 PS; 343/11 R; 356/28; 356/141

[58] Field of Search .............. 356/5, 28, 141, 152; 343/9, 11 R; 328/110

[56] References Cited

U.S. PATENT DOCUMENTS

| | | | |
|---|---|---|---|
| 3,518,555 | 6/1970 | Konotchick, Jr. | 328/110 |
| 3,545,862 | 12/1970 | Ackerman | 356/5 |
| 3,772,697 | 11/1973 | Ross | 343/17.1 R |
| 3,846,026 | 11/1974 | Waters | 356/141 |
| 3,897,151 | 7/1975 | Lecroy | 356/5 |
| 3,900,872 | 8/1975 | Jensen et al. | 343/9 |

Primary Examiner—S. C. Buczinski
Attorney, Agent, or Firm—Louis Etlinger; Richard I. Seligman

[57] ABSTRACT

An optical radar is disclosed in which fine vernier range and angular displacement accuracy is achieved by projecting a burst of coherent pulses so as to strobe a target passing through the field of view of the projection apparatus. The use of the pulse burst permits the most recent information to be utilized in obtaining the target track. Prior to projection, the pulses in the burst are sampled. The resulting signal is delayed by an amount corresponding to course range and is directed down one of a pair of oppositely directed delay lines. The signals returned from the target are detected by a sectorized receiver, with an electrical output signal from a detector in one of the sectors being applied to the other delay line in the corresponding pair, such that the signal corresponding to the returned pulse propagates in a direction opposite to that of the sampled signal corresponding to the transmitted pulse. The delay lines are tapped at various points corresponding to vernier range and each pair of taps is coupled to a device which ascertains the coincidence of counter-propagating pulses, thereby to establish the vernier range of the target from the projection apparatus. Angular displacement from boresight is measured as a function of the sector occupied by the target, with the number of pairs of oppositely directed delay lines corresponding to the number of sectors in the receiving apparatus. In one embodiment, a waterfall type display is used which displays angular displacement versus vernier range such that an accurate target track may be obtained. The receiving apparatus may be provided with zoom optics so as to vary the vernier range and angular displacement scales.

9 Claims, 7 Drawing Figures

ENHANCED ACCURACY OPTICAL RADAR

FIELD OF THE INVENTION

This invention relates to optical radars and more particularly to a method and apparatus for enhancing the accuracy of an optical radar.

BACKGROUND OF THE INVENTION

While microwave radars have in the past been utilized for obtaining target track information, radars operating in the microwave region of the electromagnetic spectrum suffer from what is commonly known as ground clutter when objects, such as missiles or planes approach the radar at close to ground level. Ordinarily, a microwave radar cannot detect objects closer than approximately ½ an antennalobe above the horizontal. This usually means that those objects traveling within 3 to 5 degrees of the horizon cannot be detected by present day microwave radar systems.

As proposed herein, it is suggested that microwave radar coverage be enhanced by the utilization of a "pulse-burst" optical radar which can detect targets within milliradians of the horizon by virtue of better diffraction performance of reasonable sized antennas. The use of the "pulse burst", which is a group of closely spaced pulses, permits the most recent information to be utilized in determining the target track, instead of a time averaged track produced by mono-pulse optical radars. Thus, as will be seen, the "pulse burst" system gives the radar a "vernier" performance characteristic which permits real time target track updating. This is especially important when the target is executing evasive maneuvers to break radar lock. Thus, the use of the "pulse burst" optical radar permits the optical radar to acquire and obtain the track of an incoming target with sufficient accuracy for fire control purposes or any other tracking purposes. It may be utilized either as an adjunct to conventional microwave radars or, for certain situations, completely in place of the microwave radar.

In general, it is also possible with optical radars to achieve finer angular resolution than is possible with microwave radars. In the subject system the angular resolution of the optical radar is on the order of 5 arc seconds. With a 20×20 element receiving array and currently available miniature detectors, as will be described hereinafter, the angular resolution of the optical radar may be brought down to 25 microradians which is an order of magnitude improvement over the accuracy of present day optical radars.

Fine angular and range resolution of the subject system is achieved by the utilization of a pulse burst of two or more pulses in which the target is illuminated successively by each of these pulses or "strobed". Thus, the target may be strobed with three pulses and the movement of the target between the first and second, and second and third pulses affords what is called "vernier range resolution", where the term "vernier" relates to the fineness of the range resolution which is obtainable. Vernier range is detected by the utilization of oppositely directed delay lines in which the signal representing the return from the target propagates in one direction down one delay line, whereas a signal representing the initial pulse, after suitable course range delay, propagates in the opposite direction down the other delay line in the pair. Cross correlation at various points along the delay lines indicates at what point in time there is coincidence between the two counter-propagating pulses. As will be appreciated, the time of correlation defines the vernier range in the boresight direction.

Strobing also permits vernier angular resolution. In order to obtain vernier angle information, a segmented receiver is utilized in which each segment is defined by the field of view of a detector. By virtue of the strobing, the output of each detector on which returned radiation impinges is correlated with a particular sampled pulse which permits the vernier range to be correlated with angular displacement from boresight. In order to correlate vernier range with angular displacement, a pair of oppositely directed delay lines is dedicated to each segment of the receiver, with the segments determining the angle off boresight.

Thus, depending on the vernier range correlation position and which of the pairs of oppositely directed delay lines carries a return signal from a target, a water fall display may be driven and the track of the incoming target can be presented in terms of angle off boresight versus vernier range. The waterfall display, by virtue of its timing, determines the track of the target. This same timing can be introduced into a computer which senses the time of the correlation to compute such a track, and to produce control signals, such as r, ṙ and θ, θ̇ for a coordinate system suitable for describing the position and track of the target.

In one embodiment, the segmented receiver is provided with zoom optics in the telescope to vary the field of view and thus the angular resolution of each detector element. In one operative embodiment the field of view of each detector element can be varied from 25° to 2° thereby to provide the optical radar with variable resolution.

In order to avoid any ambiguity due to correlations of a returned pulse with the wrong sample pulse as the pulses counter-propagate, the lengths of the delays of the delay lines are set to be less than the delay between the pulses in the burst, e.g. the interpulse spacing. It will be appreciated that as the interpulse spacing increases the radial (r) and angular (θ) velocity resolution decreases. However, assuming an interpulse spacing of 1 milliseconds, assuming a mach 1 target at 1500 feet, the the vernier range is good to 10 feet and the angular resolution = ±0.38°. This resolution requires shift register delay lines operating at a frequency of $10^7$ or higher.

Delay lines for resolving shorter interpulse spacing include tapped coaxial delay lines and acoustic delay lines.

Conventional shift register delay lines can be used color-coded pulses are used and multiple receivers are provided. In this embodiment the individual receiver respond only to one color. This approach is made feasible through the use of multi-color, multi-pulse lasers, in which the lasing medium lases at a number of wavelengths, and in which a separate Q-switched cavity is provided for each color. Control of the Q-switches in each cavity controls the interpulse spacing. Thus, each pulse is color coded and distinguishable at the receive site. Distinguishability of returned pulses eliminate overlap problems and permits the use of currently available shift register type delay lines operating at $10^5$–$10^6$ Hertz.

Without color coding and with conventional shift register delay lines in a 3 pulse burst type system, parallel trajectories will be displayed or detected. targets do not cut across several angle channels at once with proper calibration and "zeroing" of the system, one of the trajectories may be selected. When the target does cut across several angle channels at once, as would be the case with a very rapidly moving target, color coding (or other similar coding such as polarization coding) is effective to sort out the time sequence of pulse returns.

In an alternative system, which uses pulse bursts and oppositely directed delay lines, radial velocity in a given angular channel can be obtained utilizing the cross correlation approach by taking adjacent transmitted pulses and running them down oppositely directed delay lines to obtain interpulse spacing dT, and by taking adjacent returned pulses and running them down oppositely directed delay lines to obtain the received interpulse spacing ΔT. dT and ΔT are obtained by detecting at which pairs of taps cross correlated (integrated) outputs appear. Radial velocity is then easily evaluated as $$\dot{r} = \frac{c}{2}\left(\frac{dT - \Delta T}{dT}\right).$$

It is therefore an object of this invention to provide an enhanced accuracy optical radar;

It is a further object of this invention to provide an optical tracking system which is better able to direct a tracking platform to keep a selected fast-moving target on boresight;

It is a still further object of this invention to provide an optical radar capable of following evasive maneuvers of a target;

It is another object of this invention to provide vernier control for an optical radar system;

It is another object of this invention to provide an enhanced accuracy optical radar with vernier control and/or variable resolution;

It is a still further object of this invention to provide an optical radar utilizing a sectored receiver and oppositely directed delay lines for enhanced accuracy and rapid determinations of radial and angular velocity;

It is yet another object of this invention to provide an enhanced accuracy optical radar in which the target is pulse strobed to permit vernier range resolution;

It is another object of this invention to provide pulse bursts and oppositely directed delay lines for rapid radial velocity measurements.

It is a yet still further object of this invention to provide enhanced accuracy optical radar utilizing multiple color-coded pulses and oppositely directed delay lines coupled to a sectored receiver.

These and other objects of the invention will be better understood in connection with the following description in view of the appended drawings in which:

DETAILED DESCRIPTION

Figure 1:
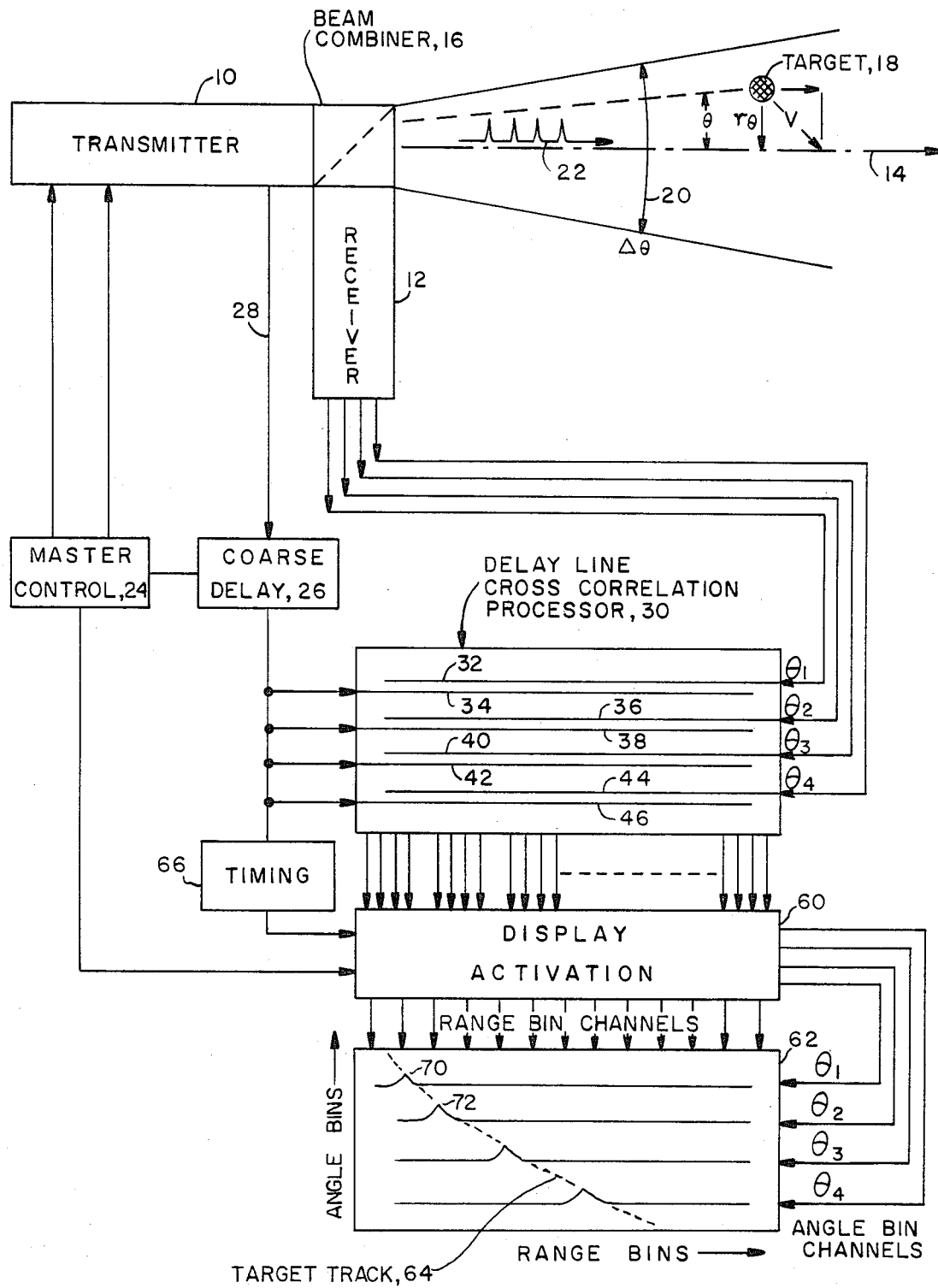
FIG. 1 is a block diagram of the subject system illustrating the utilization of oppositely directed delay lines and a waterfall display of the vernier target track.

Referring now to FIG. 1, an enhanced accuracy optical radar is illustrated as including a transmitter 10 which may be any one of a number of lasers or other sources of high intensity radiation, and a receiver 12 which, as will be described, includes focusing optics and an array of detectors. As is common, the transmitter and receiver are mounted on a stable platform (not shown). The array of detectors serves to divide up the field of view of the receiver into sectors about the boresight 14 of the radar. A beam combiner 16 permits the output from the transmitter to be transmitted in the boresight direction, while reflecting returns from a target 18 within the field of view, Δθ, of the receiver into the receiver. The field of view of the receiver is illustrated by double-ended arrow 20.

The output from the transmitter, in general, is a pulse burst, here illustrated at 22 which propagates towards target 18 and which contains a number of pulses. In the example of FIG. 1, the pulse burst contains four closely spaced pulses which are projected towards the target.

As illustrated, the target is traversing the field of view of the transmitter at a velocity v, such that its radial velocity (along the boresight axis) is r and its net velocity perpendicular thereto is $r\dot{\theta}$. Here $\theta$ represents the angular displacement of the target from the boresight axis. Although not illustrated, all measurements can be compensated in the conventional manner for platform-boresight axis slewing at the time of an observation.

The transmitter is controlled by a master control 24 which also sets a coarse delay 26. The input to the coarse delay circuit is a set of signals which represent a sampling of the pulses of the burst, and these signals are delivered over line 28 to the coarse delay unit. The coarse delay is set to the coarse range of the target from the transmitter/receiver combination such that the delay corresponds to the round trip travel time between the transmitter, the target and back to the transmitter, plus a delay corresponding to ½ the maximum delay of a signal propagating down the delay lines in a delay line cross correlation processor 30. This coarse delay may include an "electronic delay" as well as a physical delay line, distinguished by a stable time interval between an input and an output pulse. It could, for example, be based on a counter chronograph. The stability of this delay is in general comparable to the interval between taps on the fine delay lines to be described.

Processor 30 includes pairs of oppositely directed delay lines 32, 34; 36, 38; 40, 42; and 44, 46. The delayed and sampled output signals from the coarse delay unit 26 are coupled to delay lines 34, 38, 42 and 46. Assuming the receiver has a four detector array in the vertical direction, it will be appreciated these detectors define angles $\theta_1$, $\theta_2$, $\theta_3$, and $\theta_4$, thereby dividing the field of view vertically into four sectors. The outputs of each of these detectors are coupled to appropriate delay lines 32, 36, 40 and 44, such that each pair of oppositely directed delay lines is assigned or dedicated to one angular sector.

Figure 2:
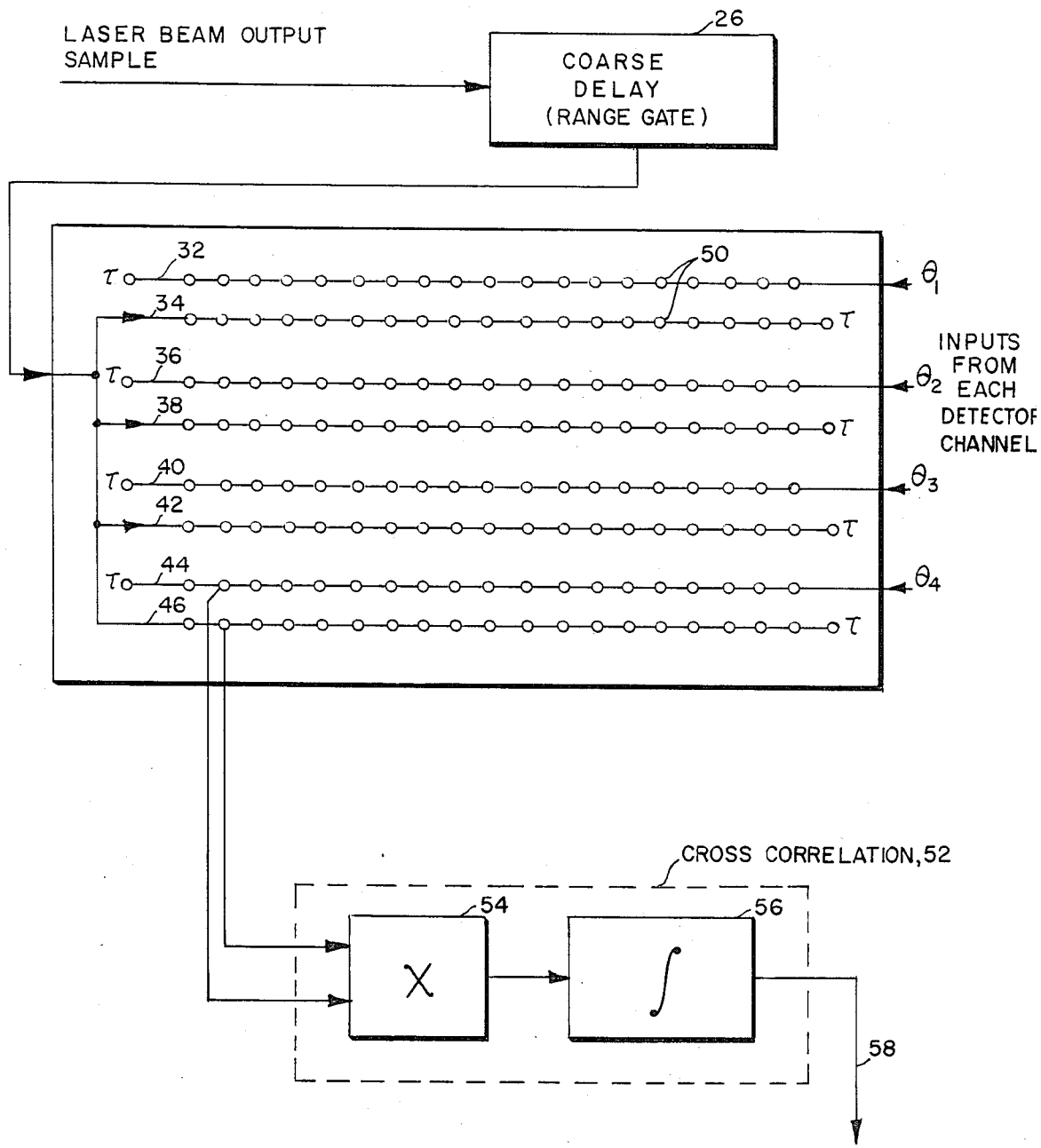
FIG. 2 is a block diagram illustrating the oppositely directed delay line configuration showing the multiple tap structure and cross correlation apparatus.

Referring for the moment to FIG. 2, the delay line cross correlation processor may be configured such that delay lines 32 through 46 have a number of taps 50, such that corresponding taps in each pair are in vertical alignment. Each of the delay lines is terminated as indicated by the letter T, such that there is no reflection back along the delay line.

Each vertically corresponding pair of taps for each pair of delay lines is connected to a cross correlation unit 52 which includes means 54 for cross multiplying the signals which appear at the vertically corresponding taps. The output of the multiplier is applied to an integration circuit 56 whose time constant is preset to 0.1 seconds in one operative embodiment. Alternatively, the integration circuit can be replaced by a conventional peak/hold circuit (not shown). The output of the cross correlation unit, available at line 58, indicates that there is an overlap of counter-propagating pulses in a delay line pair at a particular instant of time. As will be seen, the instant of pulse overlap defines the vernier range of the target from the transmitting and receiving apparatus. Obviously, the number of taps on the delay line along with the overall delay determine the resolution of the vernier range portion of the system. Each vertically corresponding set of taps defines what is called a "range bin".

Referring now back to FIG. 1, the output of processor 30 is applied to a display activation unit 60. It is the purpose of the display activation unit to apply appropriate signals to a display unit 62, in one embodiment a waterfall display, such that the vernier target track 64 is displayed on a screen. In one embodiment the display may be conceived of having a matrix of rows and columns, with the columns describing activity in a range bin, and with the rows describing activity in an angle bin. If this type matrix is a cross point matrix, then by coupling a signal to a predetermined column in a predetermined row, an indication will exist on the screen at a point indicating angular displacement from boresight versus vernier range. In order to drive such a display, the range bin output terminals, e.g. the outputs of the integrators, are coupled directly to their corresponding columns of the display. Display activation unit 60 blanks the display during the coarse range time interval and resets the display after the coarse range interval so that the fine or vernier range can be displayed. The blanking and resetting can, of course, be accomplished by interrupting the signals to the display. The coarse range interval is measured by a timing unit 66 which triggers on the first pulse of the burst and delays this pulse by a variable amount of time corresponding to the coarse range time interval. Thus, for instance, if the target is at approximately 15 nautical miles, then assuming a round trip delay corresponding to 15 nautical miles, e.g. a coarse range time interval of $\sim 1.6 \times 10^{-4}$ sec, the display activation unit is activated by timing unit 66 and thereafter in one embodiment the range bin channels are connected to the appropriate columns of the display.

It thereafter remains to activate the angle bin channel corresponding to the sector in which the target is situated. Assuming that the first pulse in the burst strikes the target, and is returned, and assuming the target is in the first sector, $\theta_1$, then the signal corresponding to the returned pulse propagates down then delay line 32, since delay line 32 is coupled to the $\theta_1$ detector. At some time the signal propagating down delay line 32 will meet a signal oppositely propagating down delay line 34. When these signals vertically overlap, a range bin is designated and a signal representing the overlap is transmitted to the display by unit 60 along with an indication that the first pulse was returned from a target in sector $\theta_1$. Unit 60 accomplishes this merely by identifying from which pair of delay lines the range bin signal comes. Thus, in the above example, the $\theta_1$ row of the display is actuated.

Upon the arrival of the second pulse in the pulse burst, target 18 will have moved across the field of view and now may occupy sector $\theta_2$. The return of this second pulse to the receiver is obviously later than the return of the first pulse. Thus, the overlapping in the $\theta_2$ pair of delay lines will occur in a range bin to the right of the original range bin. This situation is displayed as follows: The first range bin which produces an indication, produces an indication 70 in terms of a pyramid shaped trace on the display. As the target moves and is illuminated or strobed by the second pulse a second indication 72 is produced on the display. In the example shown, there are four pulses in the burst and, therefore four indications of the target track per cycle such that the track is displayed in terms of angular displacement from boresight and vernier range. For gun fire control purposes, the cross point time coincidence can be tabulated and both $$\dot{r} \approx \frac{r_2 - r_1}{T_{r2} - T_{r1}} \text{ and } r\dot{\theta} \approx \frac{r(\theta_2 - \theta_1)}{T_{\theta 2} - T_{\theta 1}}$$

can be calculated, where $\dot{r}$ is the velocity of the target in the boresight direction and $r\dot{\theta}$ is the velocity of the target in a direction orthogonal to the boresight direction. Here $T_{r2} - T_{r1} = T_{\theta 2} - T_{\theta 1}$ and is determined by the interpulse spacing of the pulse burst. r is in part derived from master control 24 for coarse range and from the range bin number thereafter. With $\dot{r}$ and $r\dot{\theta}$ in two orthogonal planes, the instantaneous velocity of the target is uniquely determined.

As will be seen by utilizing a sectored receiver in which the matrix may be a 10×10 matrix and by utilizing a pulse burst such as that described, the angular resolution of the system may be $25 \times 10^{-6}$ radians whereas, the vernier range resolution may be 1 foot. A more detailed explanation of the operation of the system of FIGS. 1 and 2 is now provided in connection with FIG. 3.

Figure 3:
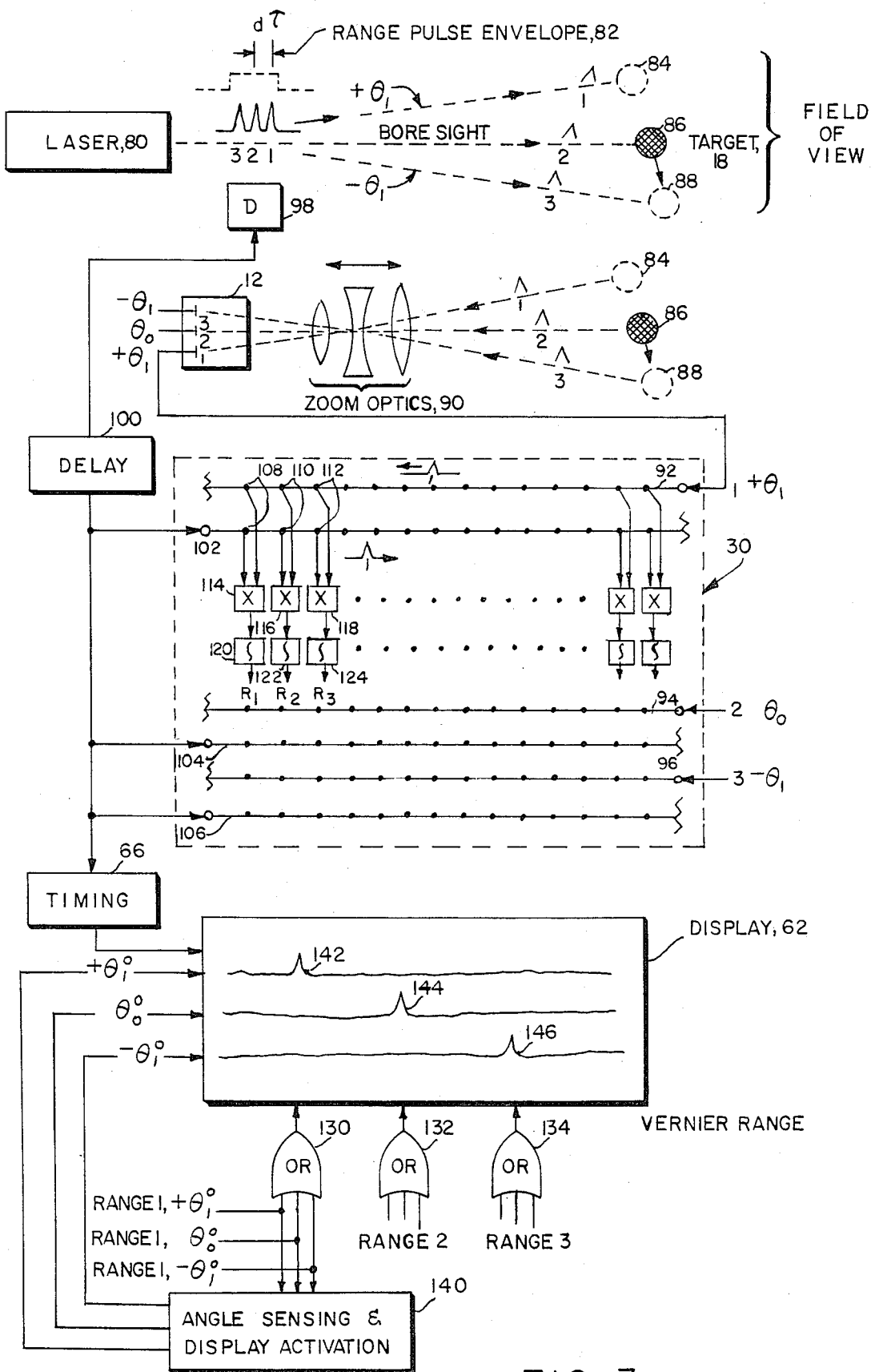
FIG. 3 is a block and schematic diagram of the subject invention illustrating the operation of the subject invention in greater detail.

Referring now to FIG. 3, in which like components between FIGS. 1, 2, and 3 bear like reference characters, for illustration purposes the pulse burst from the transmitter contains three pulses, labeled 1, 2, and 3 respectively. The pulse burst is produced by a multi cavity, multi-pulse laser 80 with a pulse envelope as illustrated at 82. The interpulse spacing or delay between the pulses, dT, is as illustrated and basically defines the vernier range resolution of the system. Target 18 is shown in three different positions as it transverses the field of view of the laser with a velocity shown by the velocity vector v. As can be seen, pulse #1 reaches target 18 when the target is at position 84. The second pulse reaches the target when the target is at position 86, and the third pulse reaches the target when the target is at position 88. The target position is replicated immediately therebeneath for convenience. In this illustration it can be seen that the first pulse is returned prior to the second pulse, and the second pulse prior to the third pulse. The returns from the target are focused, in is case by zoom optics 90, onto detectors 1, 2, and 3 of ctorized receiver 12, with each of the detectors defining a sector for the receiver. Thus, as labeled in this agram, detector 1 defines $+\theta_1$, detector 2 defines $\theta_0$, id detector 3 defines $-\theta_1$. The outputs of these detectors are coupled respectively to delay lines 92, 94 and 96 hich are of equal length. The pulse burst from laser 80 sampled by a detector generally illustrated at 98 and e signal from the detector, which comprises a like reis of pulses, is delayed at unit 100 as described herebefore. The delay of unit 100 accommodates a coarse nge adjustment plus an additional delay equal to ½ the tal delay of delay line 92, 94 or 96. The output of lay unit 100 is coupled in parallel to delay lines 102, )4, and 106. Taking the delay line pair 92, 102, it will seen that vertically adjacent taps 108, 110, 112, are upled respectively to multipliers 114, 116, and 118, hich are, in turn, coupled to integration circuits 120, 22, and 124 respectively. The outputs of integration rcuits 120, 122, and 124 indicate a target at range $R_1$, 2, $R_3$ respectively. This system is replicated for all of le taps of the delay line pairs so that correlation can be tablished at each vertically adjacent pair of taps. Each air of oppositely directed delay lines is similarly congured. The apparatus within dotted box 30 represents le apparatus corresponding to the delay line cross orrelation processor 30 of FIG. 1.

In operation, as can be seen the pulses in the delay nes are oppositely propagating and at some point during their travel, they will overlap or be coincident. The oint of overlap or coincidence defines the range of the irget which has been illuminated by pulse #1. The ength of all delay lines is such that the overall delay is ess than dT to prevent any ambiguity which would esult from the correlation of the pulse traveling along elay line 92 with more than one pulse from delay unit 00. One group of conventional delay lines suitable for se in the above example are the tapped surface acoustic ave delay lines manufactured by Hughes Aircraft orporation, Fullerton, Calif. Such a tapped delay line an be tapped at 1 nanosecond intervals such that with n interpulse spacing of 11 microseconds there can be as any as 11,000 taps per delay line for a vernier range esolution of approximately 1 foot.

The output from processor 30 is applied to display 62 hrough a display activation unit which may include a eries of OR gates, here illustrated at 130, 132, and 134, tc. Since the detector matrix is a 3×1 matrix, the OR ates are three input terminal devices. Each of the OR ates corresponds to a different range, with the input erminals of the OR gates coupled to the output of the ppropriate integration circuits. Thus, the input terminals of OR gate 130 are coupled to the range 1, $+\theta_1$; ange 1, $\theta_0$; and range 1, $-\theta_1$ output terminals of the ntegration circuits as illustrated. The remainder of the )R gates are similarly coupled to the processor. Additionally, all inputs to an OR gate are also coupled to an ngle sensing and display activation unit, here illustrated at 140, which senses or determines on which of he three lines a signal is present. This is accomplished y conventional level detectors such as National Semi-onductor Model LM160 or Fairchild Model A 710 which are coupled to conventional ROM lock up tables uch as Motorola Model MCM14524 which produce a ignal which can be used to activate a given angle bin channel corresponding to the level detector which has eceived a signal. Determining on which of the three ines a signal is present determines the angle bin which is to be activated. Thus, in the first example, the first pulse overlap occurs in angle bin $+\theta_1$ and thus the $+\theta_1$ angle bin channel is activated to produce indication 142 on display 62. Thereafter, the second pulse is returned to the receiver and results in an indication 144. Likewise, the third pulse results in an indication 146. Timing unit 66 operates as described hereinbefore to blank the display and reset it at the appropriate time so that the range indicated by the horizontal distance of any of the indications is the coarse range plus the vernier range.

Assuming an object traveling at 600 miles per hour or 880 feet per second, with a distance of closest approach of 1500 feet, setting the strobing pulses for no less than 10 foot intervals the interpulse spacing between the pulses of the burst, dT, is 11 milliseconds. With a resolution of 10 feet in a direction orthogonal to the boresight direction the angle bins need be set to no finer than 0.00667 radians or 0.38°. Assuming the equivalent of a shift register type delay line and a clock frequency of $10^8$ Hertz, the minimum velocity resolvable is ±50 feet per second in the boresight direction and an angular resolution of 0.03 radians per second at 1500 feet.

While the 10 foot resolution of the above example is indeed coarse, with presently available delay lines it is possible to achieve a ±0.01 foot resolution in terms of range along the boresight direction and, with a 20×20 array, the angular resolution may be brought down to 0.00115° or 4 seconds, with a 2° field of view, should such resolution be desirable. The angular resolution of the system can be varied as desired with the zoom optics. As an example, the field of view can typically be varied from 2° to 25° with a corresponding loss of angular resolution.

One of the limiting factors involved with range resolution is obviously the speed at which shift register delay lines can be clocked. If they cannot be clocked fast enough, the aforementioned ambiguous pulse correlations can occur.

In order to use shift register delay lines and solve the ambiguity problem it is necessary to correlate pulse 1, with sample 1, pulse 2 with sample 2, pulse 3 with sample 3 etc. One possible method of achieving the appropriate pulse correlation is to utilize a multi-color, multi-pulse laser such as that illustrated diagrammatically in FIGS. 4A and 4B.

Figure 4A:
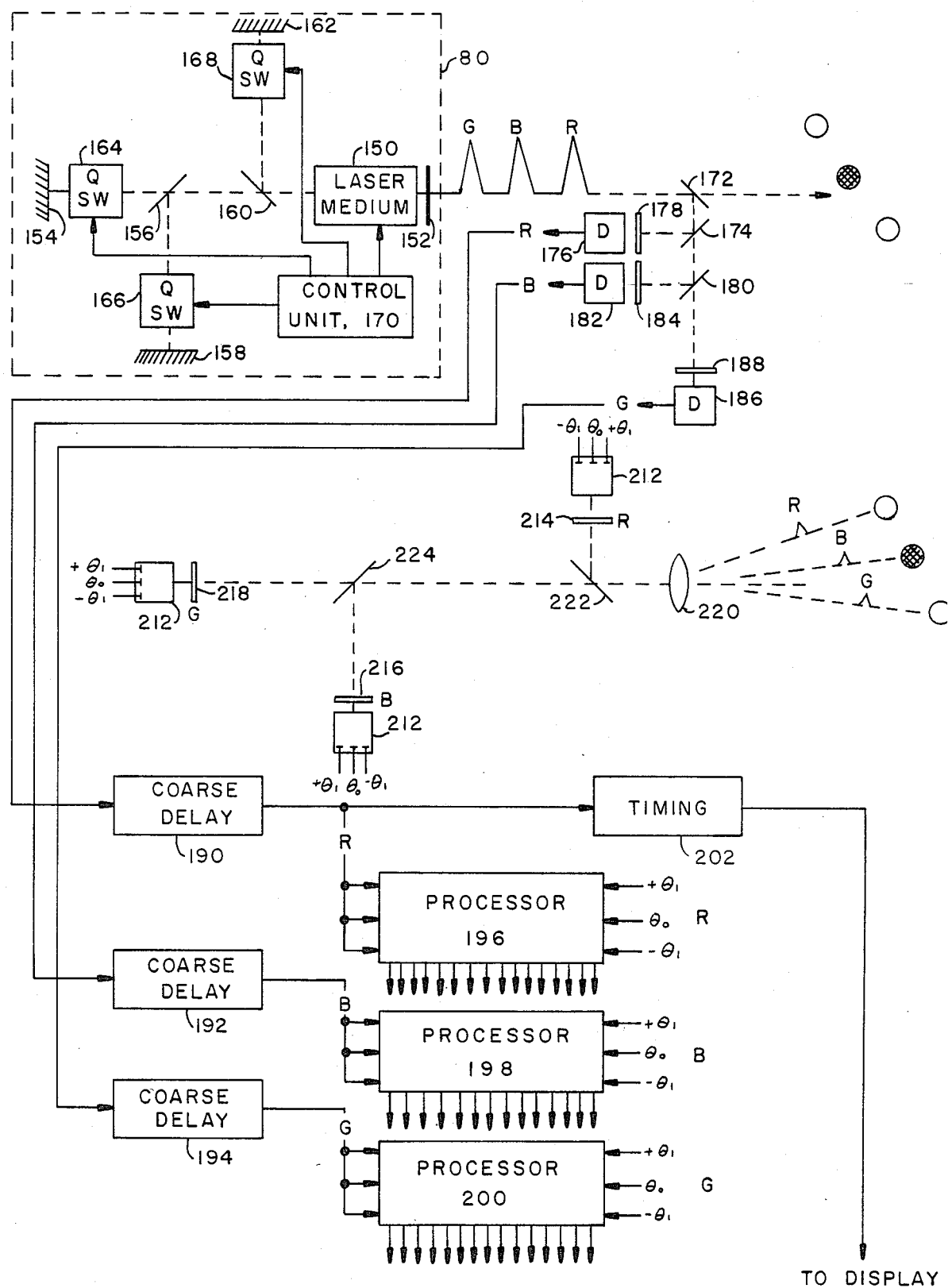
FIGS. 4A and 4B together comprise a schematic and block diagram of a multi-pulse, multi-color enhanced accuracy optical radar.
Figure 4B:
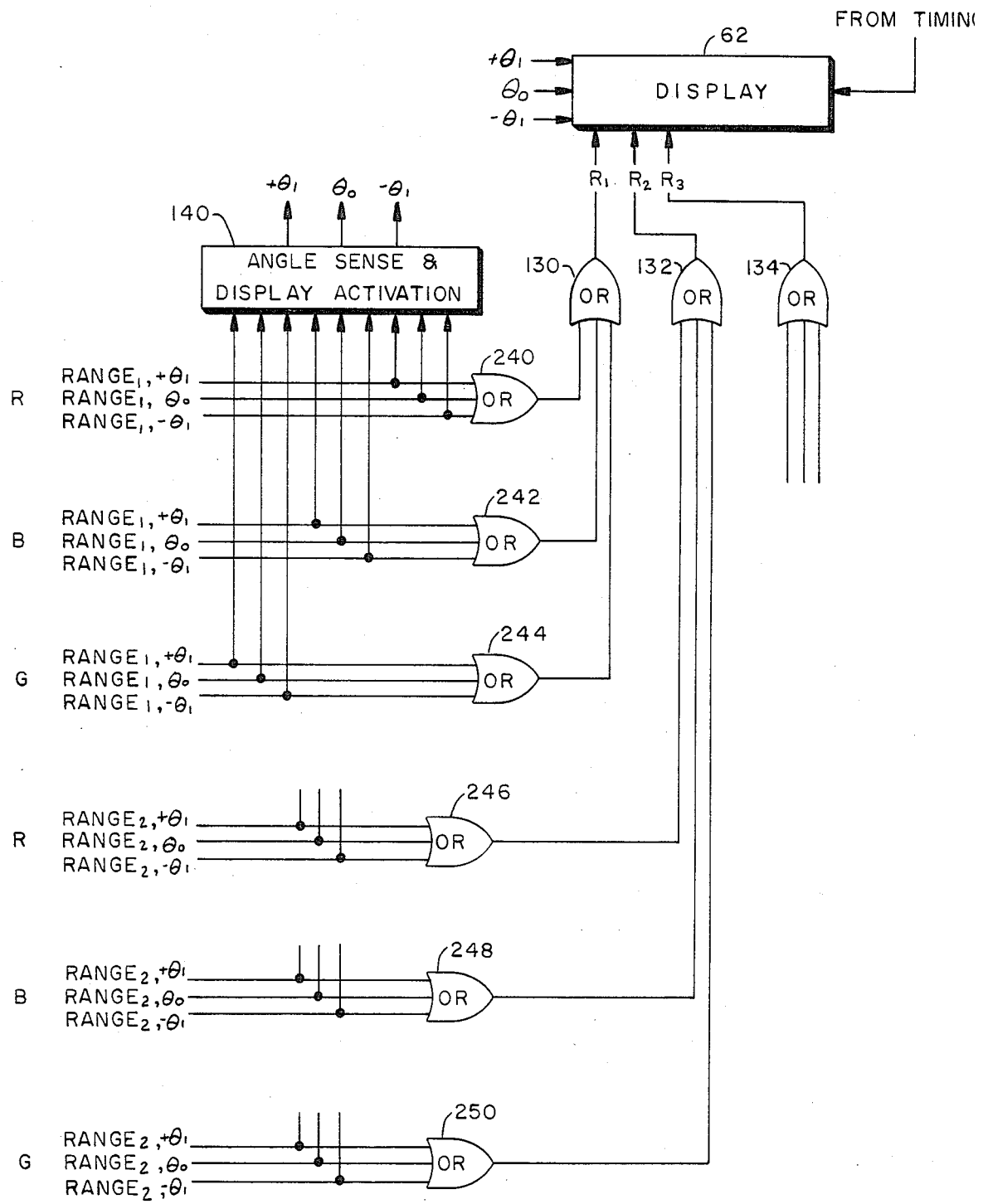

Referring now to FIGS. 4A and 4B, laser 80 of FIG. 3 may include a multi-color, multi-pulse laser which produces pulses each at a different wavelength. For convenience, in FIGS. 4A and 4B, these pulses are labeled R, B, and G for red, blue, and green, although it will be understood that the pulses may be as close in color as there are filters or color selective devices available to differentiate between the various pulses. In the illustrated embodiment, laser 80 includes a laser medium 150 which lases simultaneously at three different wavelengths. An example of such a laser medium is neodymium YAG which lases at 0.94, 1.06, and 1.3 microns. Laser medium 150 is common to three different laser cavities. One end of each of these laser cavities is common and is defined by a half-reflecting mirror 152 or other similar type device which defines the output end of the laser. One laser cavity tuned to one wavelength is defined as the path between device 152 and mirror 154, whereas a second laser cavity is defined as the path between device 152, color selective reflector 156 and mirror 158. This second cavity is tuned to a second wavelength and reflector 156 reflects radiation at this wavelength, while permitting the transmission therethrough of all other radiation. The third laser cavity is defined between device 152, color selective reflector 160 and mirror 162, with this cavity tuned to a third wavelength. Reflector 160 is reflective at this third wavelength, while being transmissive for all other wavelengths. A Q-switch switch or similar device 164 is placed in the first cavity. A Q-switch or similar device 166 is placed in the second cavity and a Q-switch or similar device 168 is placed in a third cavity. Q-switches 164, 166, and 168 are controlled by control unit 170 and are switched sequentially so as to permit the formation of the differently colored sequential pulses. The Q-switching, as is normal, takes place after the pumping of the laser medium.

The output of laser 80 is sampled by a semi-reflective mirror or like device 172 which redirects the pulses downwardly as shown. Another semi-reflective mirror 174 redirects pulses towards a detector 176. Between mirror 174 and detector 176 is a filter 178 which permits only red light to impinge upon detector 176. An additional semi-reflective mirror 180 redirects the sample pulses from mirror 172 to detector 182. Interposed between detector 182 and mirror 180 is a second filter 184 with a pass band in the blue region of the electromagnetic spectrum. Pulses redirected by mirror 172 also impinge on detector 186 which has a filter 188 disposed between this detector and mirror 180. Filter 188 has a pass band in the green region of the electromagnetic spectrum such that detector 186 only responds to the green pulse. The sampled red, blue, and green pulses from detectors 176, 182, and 186 are applied respectively to coarse delay units 190, 192, and 194. The output from coarse delay unit 190 is applied in parallel to one-half of the delay line pairs of processor 196, while the output of coarse delay unit 192 is applied in parallel to one-half the delay line pairs in processor 198. Likewise, the output of coarse delay unit 194 is applied in parallel to one-half the delay line pairs in processor 200. These processors are similar to processor 30 of FIG. 1 in that the outputs of these processors correspond to cross correlated values for vertically adjacent taps of the respective delay line pairs. The output of coarse delay unit 190 is also applied to a timing unit 202 which is similar to timing unit 66 of FIG. 1.

Referring now to the sectored receiver apparatus, in this embodiment, the sectored receiver apparatus is in effect three different sectored receivers each responding to a different wavelength of light. Thus, receivers 212 are identical to receiver 12 of FIG. 3 with the exception that each receiver has a filter immediately in front of it which has the requisite pass band for the pulses to be detected. Thus, one of the receivers is provided with a filter 214 having a pass band in the red region in the electromagnetic spectrum, with the second receiver having a filter 216 with a pass band in the blue region of the electromagnetic spectrum, and with the third receiver having a filter 218 having a pass band in the green region of the electromagnetic spectrum.

The optical system includes the usual focusing optics 220 and half-reflective mirrors or the like 222 and 224 so as to redirect the incoming radiation towards all of the receivers. The outputs of these receivers are coupled to their corresponding processors, as indicated by the R, B, and G notation to the righthand side of the processors.

Turning now to FIG. 4B, display 62, OR gates 130, 132, and 134, and angle sense and display activation unit 140 are similar to the units shown in FIG. 3. With the three color system, additional OR gates are required and these are shown as OR gates 240, 242, and 244 for the range bin 1, and OR gates 246, 248, and 250 for range bin 2. Replication of this OR gating system is, of course, required for all range bins. As can be seen, OR gate 240 is a three input device, in which its inputs are coupled to processor 196 for the red pulse, range 1 situation in which targets within sectors $+\theta_1$, $\theta_0$, $-\theta_1$ are detected. This system is duplicated for the blue pulses as illustrated by the inputs to OR gate 242 and for the green pulses is indicated by the inputs to OR gate 244. It will be appreciated that the angle sense and display activation unit 140 must ascertain for any incoming signals to these OR gates which angle bins are to be actuated. This is a routine detection and identification mater, and angle sense and display activation unit 140 operates similarly to that described hereabove. The only difference is that the number of inputs to the angle sense and display activation unit has been multiplied by the multiple-pulse triple color system described.

It will be appreciated that the display is not a multicolor display although it could be so configured. Rather in this embodiment, the display is exactly the same as that shown in FIG. 3, with the only difference that the vernier range resolution is no longer dependent on the bandwidth of the delay line to prevent false pulse correlations with higher pulse rates or closer pulse spacing. This permits increased range resolution to the limit of the detector response.

Figure 5:
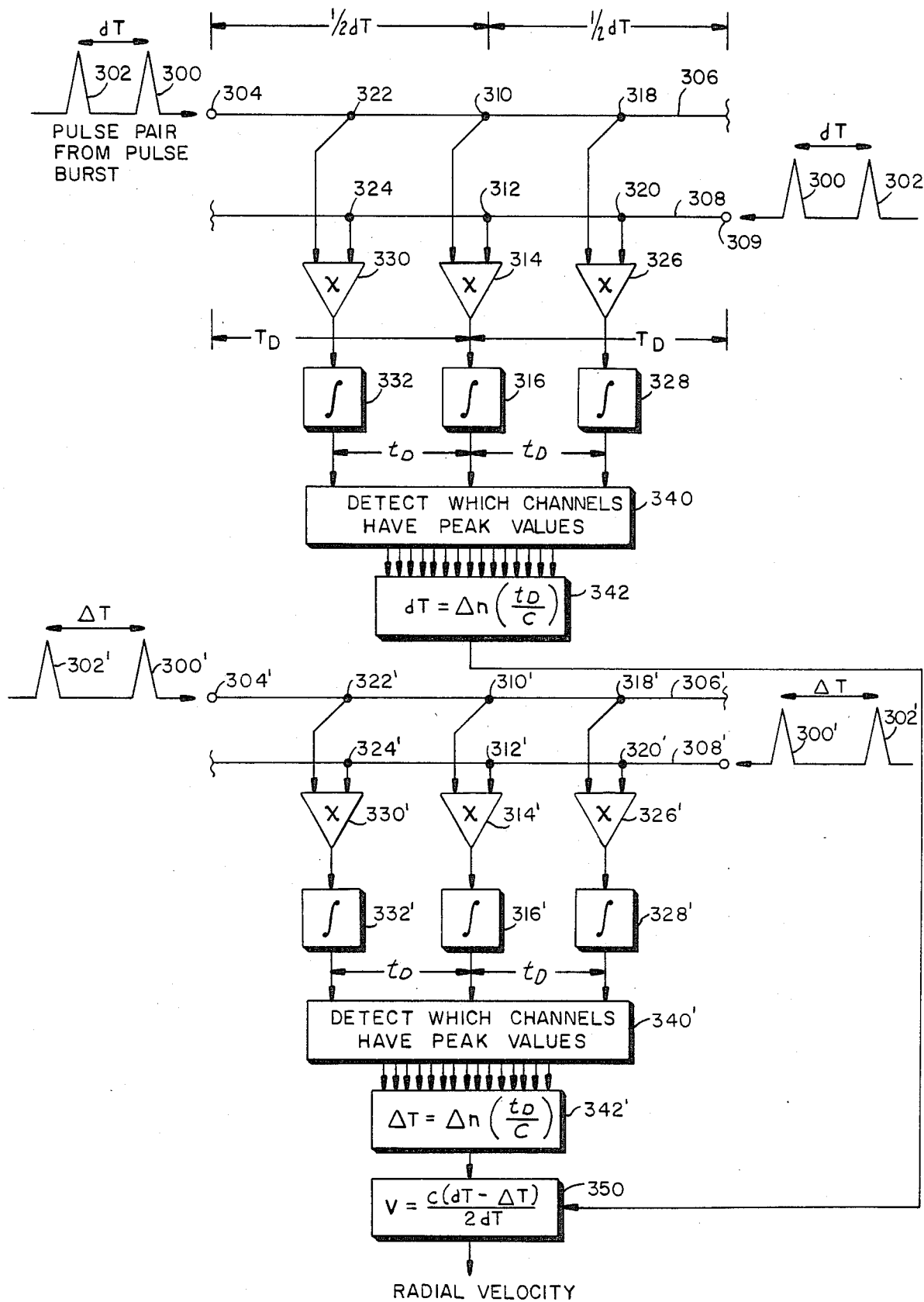
FIG. 5 is a schematic and block diagram of a system for rapidly determining radial velocity of a target.

In an alternative embodiment, radial velocity may be measured directly by the utilization of oppositely directed delay lines. The use of the delay lines permits finer resolution than electronic coincidence gates when the electronic devices are unable to keep up with the pulse shapes obtainable. The important parts of such a system are illustrated in FIG. 5. It is assumed that there is available at least a pair of pulses from the pulse burst which is transmitted and also a corresponding pair of pulses returned from the target. As mentioned hereinbefore, the interpulse spacing of the transmitted pulse pair is dT and the interpulse spacing of the returned pulses is $\Delta T$. As will be seen, the radial velocity $$\dot{r} = \frac{c(dT - \Delta T)}{2\,dT},$$

where c is the speed of light. Thus, in order to derive radial velocity all that is necessary is to measure accurately dT and $\Delta T$. It will, of course, be appreciated that if the target is receding from the radar $\Delta T$ will be larger than dT, whereas if the target is approaching the radar $\Delta T$ will be less than dT.

Exceedingly fine "vernier" measurement of dT and $\Delta T$ is easily accomplished by the utilization of oppositely directed delay lines. Referring to FIG. 5, assuming pairs of pulses 300 and 302, this pulse pair is applied to an input terminal 304 of one delay line 306 and the same pulses are applied in an opposite direction to an oppositely directed delay line 308 at input terminal 309. These are tapped delay lines with vertically adjacent taps in which taps 310 and 312 correspond respectively to the center of the delay line. These taps are set such that they correspond to a delay of approximately ½ dT. If the interpulse spacing between pulses 300 and 302 is exactly dT, then the first pulse in each of these pulse doublets will arrive at the vertically adjacent taps 310 and 312 simultaneously. Output signals from these taps e applied to a multiplier 314 which is coupled to an
tegration circuit 316 which has an integration time
reater, and usually much greater, than the expected dT
terpulse spacing. Multiplier 314 and integrator 316
erform a cross correlation function as is described
ereinbefore.

As illustrated, the delay lines are also provided with
ertically adjacent taps 318 and 320; and 322 and 324
aced on either side of taps 310 and 312 by an amount
orresponding to a delay of $t_D$. The signals at the pair of
ertically adjacent taps 318 and 320 are applied to a
ultiplying circuit 326, the output of which is applied
o an integration circuit 328. Likewise, the output sig-
als from the vertically adjacent pair or taps 322 and
24 are applied to a multiplying circuit 330, the output
f which is likewise coupled to an integration circuit
32. The outputs of integration circuits 316, 328, and
32 are applied to a unit 340 which includes a number of
ircuits which detect which channels have the peak
alues, e.g. which integration circuits have the largest
mplitude signals. Such circuits are conventional and
re available from National Semiconductor as level
etector LM 160, as mentioned before.

Figure 6:
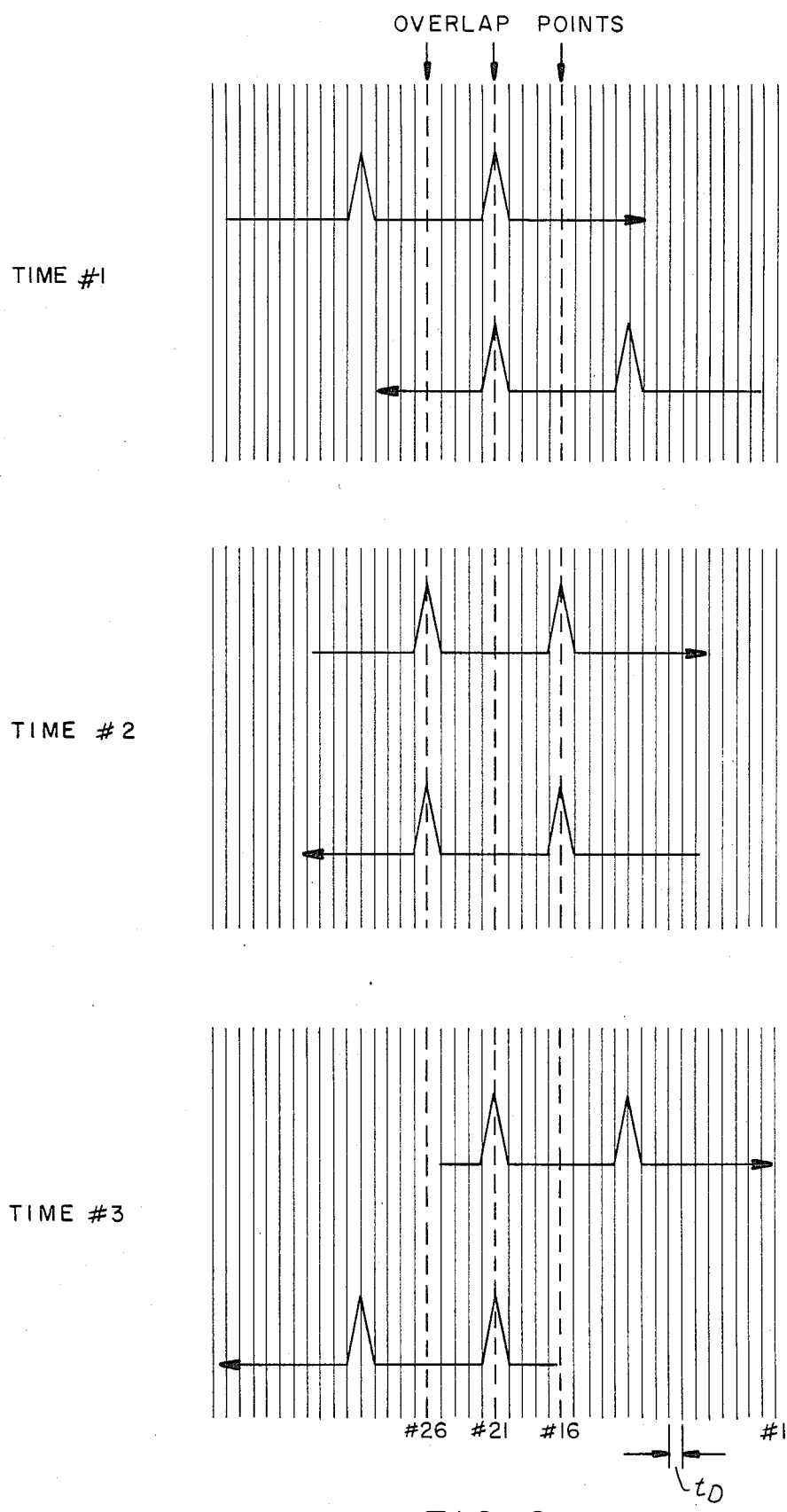
FIG. 6 is a waveform diagram explaining the operation of the system of FIG. 5.

As illustrated in FIG. 6, at time #1 as the double
ulses counter-propagate with respect to each other
here will be cross correlation between a first pulse
unning down one line and a first pulse running down
he other. Here the overlap point is at vertically adja-
ent points labeled #21. Later at time #2 there will be
pair of overlap points here shown at #'s 16 and 26.
ater still at time #3 there will again be pulse overlap,
nd this will occur at the vertically adjacent pair of
oints #21. If the vertically adjacent taps are spaced by
n amount $t_D$ and assuming a delay line propagation
peed of C, then $$'T = \Delta \eta \left[ \frac{t_D}{C} \right].$$

Thus, $dT = (26 - 21) \left[ \frac{t_D}{C} \right]$ or $dT = (21 - 16) \left[ \frac{t_D}{C} \right]$.

Here C is the speed of electromagnetic wave propaga-
ion in the delay line.

Returning to FIG. 5 in one embodiment the outputs
of unit 340 designating the channel numbers of the verti-
ally adjacent pairs carrying the correlation are applied
o a conventional microprocessor 342 which computes $$dT = \Delta \eta \left[ \frac{t_D}{C} \right].$$

Delay increments $t_D$ are selected small enough such
that $t_D/dT = \delta_{min}$, the minimum value of $\delta$ at which
doppler information is desired, say $10^{-7}$. Then, pro-
vided the pulses are sharp enough compared to $t_D$, and
of adequate signal/noise ratio, the correlated ampli-
tudes will differ measurably. With the same type delay
lines for both emitted and returned pulse pairs, any
difference in the measured pulse spacings implies signif-
icant doppler shift, with each unit of $t_D$ corresponding
to a unit of $$\delta_{min.} = \frac{2 \dot{r}_{min.}}{c}$$

The exact same system is utilized for the returned
pulses, and this system carries reference characters dif-
ferentiated from the above described system by the use
of the prime symbol.

In order to obtain radial velocity, the output of unit
342 and the output of unit 342' are applied to a device
350 which computes $$\dot{r} = \frac{c(dT - \Delta T)}{2dT}$$

where c is the speed of light and this is the radial veloc-
ity. This device is simply a microprocessor such as Intel
8080.

For $\dot{r}_{min.}$ equal to 100 miles per hour, and the corre-
sponding $\delta = 10^{-7}$, the resolution requirements are that
each pulse have resolvable features on a time scale of
$10^{-7} \times$ the spacing "dT". This will be so if "dT" ~ 1
$\mu$sec with a delay line bandwidth $\geq 1$ GHz, pulsewidth
at half maximum = 1 $\mu$sec., as long as the shape of the
pulse and clean signal/noise permits subdivision into
$10^4$ parts. Of course, averaging of many spaced pulse
sets, as would be the case in a multi-pulse burst of more
than two pulses, improves the signal-to-noise measure-
ment and quality as well.

I claim:
1. An optical radar comprising:
    means for projecting a pulsed burst towards a target;
    means for receiving the pulsed burst as reflected by a
        target, said receiving means including a sectored
        receiver for dividing up the field of view of the
        receiver into angular segments; and,
    oppositely directed delay line cross correlation means
        coupled to the projecting and receiving means for
        providing vernier range indications of the target,
        said oppositely directed delay line cross correlation
        means including pairs of oppositely directed delay
        lines, each delay line pair processing signals re-
        tained from a target within a different angular seg-
        ment.
2. The radar of claim 1 and further including means
for correlating range indications from said oppositely
directed delay line cross correlation means with the
angular segment occupied by the target responsible for
the range indication.
3. An optical radar with vernier capability compris-
ing:
    means for projecting a pulse burst including a number
        of pulses having a predetermined interpulse spac-
        ing towards a predetermined sector of space;
    means for receiving pulse returns from a number of
        different angular subdivisions of said sector of
        space and for producing output signals, each corre-
        sponding to the presence of a target in a given
        subdivided sector, and each corresponding in time
        of arrival to the range of the target from the receiv-
        ing means;
    oppositely directed delay line pairs, one each per
        subdivided sector, each pair of delay lines having
        vertically adjacent taps distributed down the
        lengths thereof;
    means for sampling and delaying said pulse burst at
        the time of projection, and for applying the sam- pled delayed pulse burst signal to one delay line in each pair such that the sampled delayed pulse burst travels down these delay lines in one direction;

means for assigning a delay line pair to each subdivided sector and for applying the output signals from the receiving means to corresponding delay line pairs, such that an output signal corresponding to a target in a given subdivided sector is applied to the other delay line of the corresponding pair and travels down said other delay line in a direction opposite to the sampled delayed pulse burst signal in said one delay line;

means for cross correlating the signals in the pairs of delay lines at said vertically adjacent taps to establish the range of a target within a given subdivided sector; and, means for correlating the range established by said cross correlating means with the angular subdivision occupied by the target so as to establish the velocity and direction of travel of the target across said sector of space.

4. An optical radar with vernier capability comprising:

means for projecting a pulse burst including a number of pulses having a predetermined interpulse spacing towards a predetermined sector of space;

means for receiving pulse returns from a number of different angular subdivisions of said sector of space, said subdivided sector defining vernier angle bins, said receiving means including means for producing output signals, each corresponding to the presence of a target in a given subdivided sector and each corresponding in time of arrival to the range of the target from the receiving means;

oppositely directed delay line pairs, one each per subdivided sector, said pairs being provided with vertically adjacent taps such that pairs of vertically adjacent taps define vernier range bins;

means for sampling said pulse burst at the time of projection so as to provide a corresponding signal, for delaying the sampled pulse burst signal by an amount corresponding to a predetermined coarse range and for applying the sampled, delayed pulse burst signal to one line in each pair of delay lines such that the sampled, delayed pulse burst travels down these lines in one direction;

means for assigning a delay line pair to each subdivided sector and for applying the output signals from the receiving means to corresponding delay line pairs, such that an output signal corresponding to a target in a given subdivided sector is applied to the other delay line of the corresponding pair and travels down the delay line in a direction opposite to the sampled, delayed pulse burst signal in said one delay line;

means for cross correlating the signals in the pairs of delay lines at said vertically adjacent taps thereby to establish the range of a target within a given subdivided sector; and, means for correlating the range established by said cross correlating means with the angular subdivision occupied by the target so as to establish the velocity and direction of travel of the target across said sector of space in terms of the occurrence of signals in the range and angle bins, established by the taps and subdivided sectors.

5. An optical radar comprising:

means for projecting a pulsed burst towards the target;

means for receiving the pulsed burst as reflected by the target; and, oppositely directed delay line cross correlation means coupled to the projecting and receiving means for providing vernier target information, said oppositely directed delay line cross correlation means including at least two pairs of oppositely directed delay lines, the interpulse spacing of the projected burst being dT and that of the reflective burst being $\Delta T$, one of said pairs providing a signal representing dT and the other of said pairs providing a signal representing $\Delta T$, said oppositely directed delay line cross correlation means including means for solving $r=C(dT-\Delta T)/2dT$ in terms of the signal from said delay line pairs, thereby to obtain the velocity of said target, where r is radial velocity and c is the speed of light.

6. The radar of claim 5 wherein each delay line has an input terminal and further including means for providing at the input terminal of each delay line of said one pair of delay lines a signal representing a pair of the projected pulses, and means for providing at the input terminal of each delay line of said other pair of delay lines a signal representing a pair of pulses which have been reflected by a target, and wherein each of said delay line pairs includes a number of pairs of vertically adjacent, horizontally-spaced taps, means for correlating the signals in said delay lines at each pair of vertically adjacent taps and means for ascertaining at which of said pairs of vertically adjacent taps the correlation has occurred.

7. Apparatus for determining the interpulse spacing between adjacent pulses comprising:

a pair of oppositely directed tapped delay lines, each having an input terminal, means for simultaneously applying a signal representing the adjacent pulses to said input terminals, means for tapping said delay lines at a plurality of horizontally-spaced vertically-adjacent points, means for correlating the signals in the delay lines at each pair of vertically adjacent taps; and, means for ascertaining at which of said pairs of vertically adjacent taps correlation has occurred.

8. The apparatus of claim 7 wherein one of said pairs of taps lies midway between the ends of the delay line, the other of said pairs of taps being symmetrically located about said one pair.

9. The apparatus of claim 8 wherein said taps are spaced horizontally by a time interval $t_D$, wherein the vertically adjacent sets of taps are numbered sequentially, wherein the propagation speed of said delay line is C and wherein the interpulse spacing is equal $\Delta n(t_D/C)$ where $\Delta n$ refers to the difference in the vertical tap numbers at which correlations occur.

* * * * *